(12) United States Patent
Ward (10) Patent No.: US 8,657,583 B2
(45) Date of Patent: Feb. 25, 2014

(54) CENTRIFUGAL PUMP WITH COAXIAL INLET AND OUTLET AND LIQUID LEVEL DETECTOR

(75) Inventor: Charles Barry Ward, Merritt Island, FL (US)

(73) Assignee: Diversitech Corporation, Duluth, GA (US)

( * ) Notice: Subject to any disclaimer, the term of this patent is extended or adjusted under 35 U.S.C. 154(b) by 279 days.

(21) Appl. No.: 13/292,294

(22) Filed: Nov. 9, 2011

(65) Prior Publication Data
US 2012/0118412 A1 May 17, 2012

Related U.S. Application Data

(60) Provisional application No. 61/414,188, filed on Nov. 16, 2010.

(51) Int. Cl.
*F04B 49/00* (2006.01)
(52) U.S. Cl.
USPC .......................................................... 417/36

(58) Field of Classification Search
USPC ................ 417/36, 44.1, 63, 423.1; 73/304 C; 415/226, 207; 137/392, 558, 565.17
See application file for complete search history.

(56) References Cited

U.S. PATENT DOCUMENTS

| | | | | | |
|---|---|---|---|---|---|
| 2,863,317 | A | * | 12/1958 | Rings | 73/201 |
| 3,726,614 | A | * | 4/1973 | Schellenberg | 417/517 |
| 3,781,672 | A | * | 12/1973 | Maltby et al. | 324/663 |
| 4,088,145 | A | * | 5/1978 | Noren | 134/104.4 |
| 4,643,824 | A | * | 2/1987 | Akazawa et al. | 210/167.28 |
| 5,121,631 | A | * | 6/1992 | Koon | 73/290 R |
| 2007/0224050 | A1 | * | 9/2007 | Ward | 417/41 |
| 2008/0134779 | A1 | * | 6/2008 | Tung et al. | 73/304 C |

* cited by examiner

*Primary Examiner* — Devon Kramer
*Assistant Examiner* — Charles W Nichols
(74) *Attorney, Agent, or Firm* — Smith Gambrell & Russell LLP

(57) ABSTRACT

A liquid handling system having a tank with a centrifugal pump for pumping the liquid out of the tank is disclosed. The centrifugal pump is located beneath tank and has a coaxial inlet-outlet. Capacitive sensors are used to detect the level of liquid in the tank, and control circuits are connected to the capacitive sensors and control the operation of the pump.

12 Claims, 9 Drawing Sheets

CENTRIFUGAL PUMP WITH COAXIAL
INLET AND OUTLET AND LIQUID LEVEL
DETECTOR

CLAIM OF PRIORITY

This application claims priority from U.S. Provisional Patent Application Ser. No. 61/414,188, filed Nov. 16, 2010, which is incorporated herein in its entirety.

FIELD OF THE INVENTION

This invention relates to a liquid handling system including a pump and a liquid level detector and more particularly to a pump for pumping liquid from a tank to a remote location.

BACKGROUND OF THE INVENTION

Liquid handling systems for moving and storing liquids generally require a pump for moving liquid from one location to another and means for determining the level of a liquid in a tank or other liquid storage vessel. One such liquid handling system is a condensate pump for use with a heating, ventilation, and air-conditioning (HVAC) system. A conventional condensate pump has a tank or reservoir for collecting condensate from the evaporator of the HVAC system, and a centrifugal pump for pumping the condensate liquid from the tank to a remote location for disposal. The centrifugal pump may be submerged in the liquid inside the tank or may be located outside the tank, typically in a location that is lower than the liquid level in the tank.

When the centrifugal pump is submerged in the liquid, the centrifugal pump is positioned at the lowest point in the tank in order to assure that the centrifugal pump can remove most of the liquid from the tank. An electric motor is typically mounted above the tank and is connected to the impeller of the centrifugal pump by means of a shaft. Likewise, the control circuitry is typically mounted adjacent the motor. The electric motor spins the impeller within a volute-shaped housing of the centrifugal pump, and through centrifugal force, the impeller expels the liquid from the volute-shaped housing through one or more pump outlets that are tangent to the impeller's direction of rotation. The centrifugal pump may be plumbed to convey the liquid from the pump outlet to an elevation higher than that of the tank. Often the plumbing circuit connected to the pump outlet includes a check valve to prevent liquid from flowing back into the tank when the pump is shut off. In order to control the operation of the motor and therefore the operation of the centrifugal pump, the control circuitry must include means for determining the level of liquid in the tank. Such means for determining the level of liquid in the tank may include mechanical means, such as floats, or may include electric means, such as capacitance plates submerged in the liquid in the tank.

In condensate pumps where the centrifugal pump is positioned below the tank, the bottom of the tank may be fitted with a drain or screen-drain, the location of which is at the lowest point of the tank to receive the liquid by way of a gravity feed. The drain fitting is plumbed to the inlet of the centrifugal pump to convey the liquid to the pump's impeller.

The centrifugal pump system described above, whether submerged in the liquid or connected to a drain from the tank, may be plagued with difficulties as a result of air or other gas trapped inside the volute-shaped housing of the centrifugal pump. Once the tank is filled with liquid, the centrifugal pump must start against head pressure created by liquid located above the pump in the tank and in the pump's outlet plumbing. As long as the volute-shaped housing is filled with liquid, the pump can start, expel liquid, and draw in new liquid from the tank. A problem may occur if the liquid has entrained air or gas. On the suction side of the pump (the pump inlet), trapped gas will tend to expand and separate from the liquid. This trapped gas, being less dense than the liquid, will be forced away from the outlet of the pump by the denser and higher pressure at the impeller's periphery, and the trapped gas will tend to collect at the suction or neutral pressure center of the impeller. If the fluid flow is great enough, the trapped gas will be expelled through the pump outlet along with the liquid. Consequently, the centrifugal pump can be caught in three distinct modes of operation:

1. In a normal pumping mode, the liquid completely fills the inlet and outlet of the centrifugal pump, and the centrifugal pump continuously intakes liquid through the pump inlet and expels the liquid through the pump outlet.
2. In a second pumping mode of operation, gas expands out of the inflowing liquid, creates gas bubbles inside the volute-shaped housing, and minor cavitation results during the pumping operation. Because of the low volume of gas, some liquid flow continues, and the gas is discharged through the outlet of the volute-shaped housing. In this situation, pumping efficiency is reduced and audible noise is increased because of the cavitation.
3. In a third pumping mode, gas expands out of the inflowing liquid and creates a gas bubble at the inlet of the centrifugal pump. Liquid trapped at the discharge outlet of the pump and around the periphery of impeller creates a high pressure restriction. Between the liquid head pressure from the tank and the liquid head pressure of the outlet discharge plumbing, the centrifugal pump cannot move the gas bubble that is trapped in the pump's volute-shaved housing. Because the gas bubble cannot be cleared from the volute-shaped housing, liquid flow does not occur, and the pump simply spins gas or a gas/liquid mixture. This condition is sometimes confused with cavitation but in fact is a simple balance of liquid pressure and gas pressure within the volute-shaped housing. Often the bubble of gas will remain in the impeller's volute-shaped housing when the centrifugal pump is stopped and will continue to block liquid flow through the pump when the pump is restarted.

As previously indicated, in order to control the operation of the centrifugal pump for a condensate pump, the condensate pump must be able to determine accurately the liquid level in the tank and in the pump's volute-shaped housing. In a conventional condensate pump, a float monitors and detects the water level within the pump's tank. In response to movement of the float within the tank, associated float switches and a float control circuitry control the operation of the electric motor driving the impeller of the centrifugal pump, trigger alarms, or shut down the HVAC system if necessary. The condensate pump float is in contact with the water in the tank and is subject to fouling from debris and algae buildup. A molded float has seams, which may fail causing the float to sink or malfunction. The float switch that is used to control the on/off operation of the electric motor is often a specialized and costly bi-stable snap-action switch. A conventional condensate pump, which incorporates a safety HVAC shut off switch and/or an alarm switch in addition to the motor control switch, may have a separate float or linkage to operate the HVAC shutoff switch or the alarm switch further complicating the condensate pump. Further, a conventional condensate pump often requires a float mechanism retainer to prevent shipping damage, and the float mechanism retainer must be removed prior to pump use.

The prior art has also adopted capacitive sensors as liquid level detectors to determine the level of the water in the tank of the condensate pump to replace the mechanical float for controlling the operation of the pump motor, for triggering alarms, or for shutting down the HVAC system if necessary. In some conventional liquid level detectors, at least one of the capacitance plates of the capacitive sensors is in contact with the water in the tank in order to produce a detectable change in capacitance as the water contacts or exposes the capacitance plate of the capacitive sensor. In another prior art capacitive sensor, the capacitance plates are mounted outside of the tank and not in contact with the water in the tank. In order to determine accurately the water level, such prior art external capacitive sensors have a first capacitance plate extending the height of the tank and one or more additional capacitance plates position at anticipated transition points along the height of the tank in order to determine when the water level has reached one of the transition points. Such additional capacitance plates are deemed necessary in order to offset the effects of deposits that may form on the inside of the tank adjacent to the external capacitive sensor thereby affecting the capacitance value.

SUMMARY OF THE INVENTION

In order to solve the problems associated with the presence of gas in a centrifugal pump, the present invention provides a coaxial inlet and outlet configuration for the centrifugal pump. The centrifugal pump with its integral electric motor is mounted below the tank. The pump inlet of the centrifugal pump is located at the center of the volute-shaped housing and is connected to the small end of a funnel. The large end of the funnel is connected to the bottom of the tank so that liquid in the tank is fed through the funnel to the pump inlet by gravity. The pump outlet of the centrifugal pump is coaxially positioned within the funnel and communicates with the periphery of the volute-shaped housing. Such a coaxial inlet and outlet configuration with a funnel feed inhibits gas from being trapped at the inlet (center) of the volute-shaped impeller housing. The volute-shaped impeller housing with its funnel inlet and coaxial outlet can be molded or cast as a single piece without the need for additional machining operations. Moreover, the funnel connected to the pump inlet is configured to produce a flow of water into the volute-shaped impeller housing in a direction counter to the rotation of the impeller thereby further inhibiting gas from being trapped at the inlet to the volute-shaped impeller housing.

In order to detect the level of liquid in the tank and thereby control the operation of the electric motor of the centrifugal pump, an external capacitive sensor is mounted externally on one of the walls of the tank. Particularly, the external capacitive sensor comprises a printed circuit board that extends along the height of the tank. The printed circuit board has a shield foil on the outside of the printed circuit board to shield the capacitive sensor from external electromagnetic noise and interference. The shield foil is connected to circuit ground. The shield foil may also be configured as part of a guard ring circuit to decrease the impedance of the shield foil and thereby providing greater shielding against external electromagnetic noise and interference. The printed circuit board also has one or more sensor foils (capacitance plates) positioned on the printed circuit board between the printed circuit board and the external wall of the tank. The sensor foils are connected to a control circuit that determines the liquid level based on the capacitance values measured at the sensor foils. In addition, a pump sensor terminal (capacitance plate) is positioned inside the volute-shaped impeller housing or in the inlet of the volute-shaped impeller housing for determining the presence or absence of liquid within the volute-shaped impeller housing.

In one embodiment of the capacitive sensor, the sensor foil may include a single foil extending the height of the tank. In another embodiment of the capacitive sensor, the sensor foil may include a series of sensor foils extending along the height of the tank and divided from each other vertically to create separate sensor foils with recognizable transition points between the vertically separated sensor foils. Further, the sensor foil or foils may be configured in a discontinuous pattern, such as a hexagonal pattern, to create discontinuities within each sensor foil and thereby recognizable discontinuities in the sensed capacitance.

As the liquid in the tank rises, the sensor foils, either as a single continuous foil or as a series of separate vertically spaced foils, provide recognizable capacitance values, which in turn are resolved by the control circuit as particular liquid levels within the tank. From the sensed liquid level, the control circuit can control the operation of the motor of the centrifugal pump to start the centrifugal pump when the tank has filled with liquid to a predetermined level, to stop the motor of the centrifugal pump when the tank has emptied to a predetermined level, to shut off the source of liquid into the tank, such as by shutting off an HVAC system, and to sound an alarm if the liquid reaches a critical high level in the tank.

If the control circuit determines that the volute-shaped impeller housing has dried out based on the capacitance value measured at the pump's sensor terminal within the centrifugal pump or near the pump inlet of the centrifugal pump, the control circuit can start the centrifugal pump in a priming mode. The priming mode rapidly turns the motor of the centrifugal pump on and off in an attempt to knock any air bubbles off of the impeller blades before the pumping operation begins.

Further objects, features and advantages will become apparent upon consideration of the following detailed description of the invention when taken in conjunction with the drawings and the appended claims.

DETAILED DESCRIPTION OF THE PREFERRED EMBODIMENT

Figure 1:
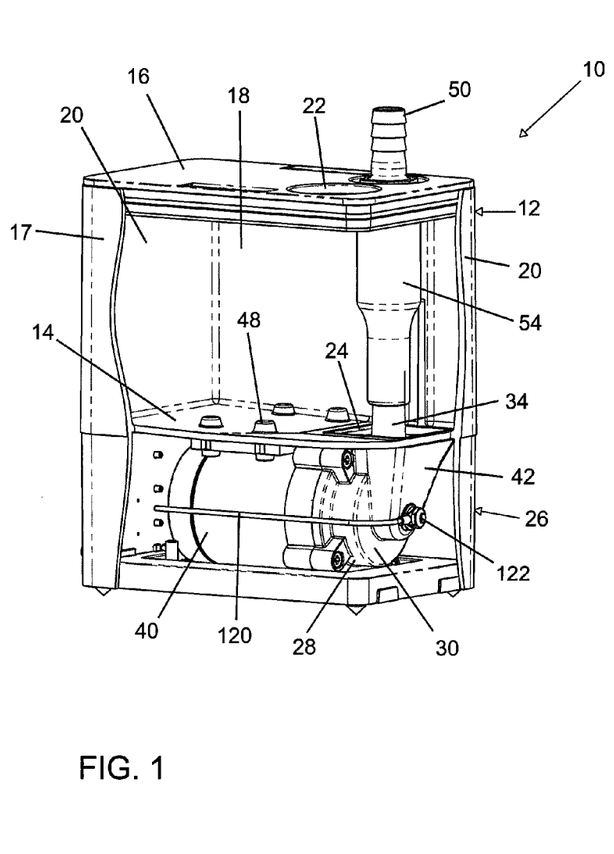
FIG. 1 is a front perspective view (front and right side) of a condensate pump having a centrifugal pump with a coaxial inlet and outlet in accordance with the present invention.
Figure 2:
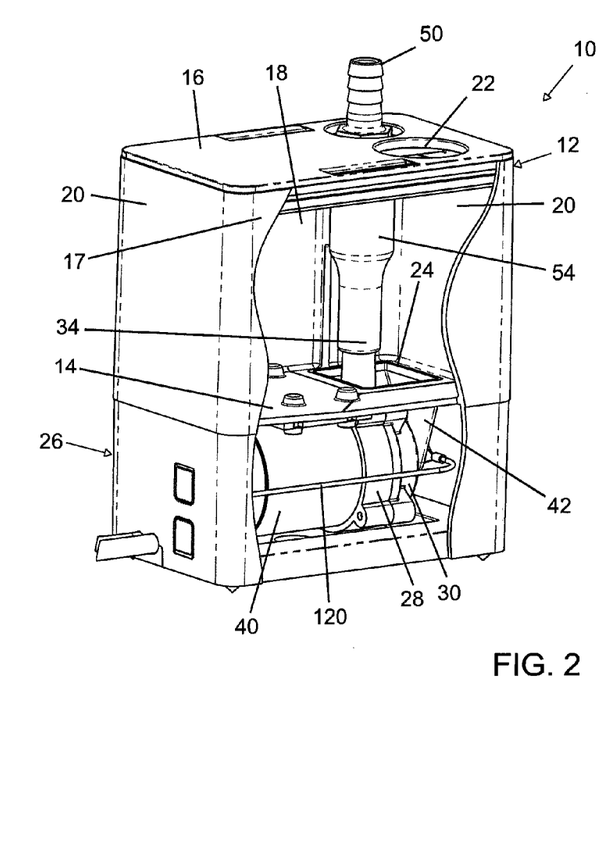
FIG. 2 is a front perspective view (front and left side) of the condensate pump having a centrifugal pump with a coaxial inlet and outlet in accordance with the present invention.

Turning to FIGS. 1 and 2, a condensate pump 10 is shown comprising a tank (or reservoir) 12, a base 26, and a centrifugal pump 28 with an integrated electric motor 40. The tank 12 and the base 26 are molded as a single part. The base 26 houses the centrifugal pump 28 and the integrated electric motor 40 below the tank 12.

As shown in FIGS. 1 and 2, the tank 12 is generally rectangular in shape and has a tank bottom 14, a tank top 16, a tank front 17, a tank back 18, and tank sides 20. The tank 12 has a tank inlet 22 in the tank top 16 for receiving liquid, such as condensate water from an HVAC system. The tank 12 has a tank outlet 24 (FIG. 11) in the bottom 14 of the tank 12 that is generally rectangular in shape. The centrifugal pump 28 with the integrated electric motor 40 is fastened by means of screws 48 to the underside of the bottom 14 of the tank 12.

Figures 12, 13, 14, 15, 16:
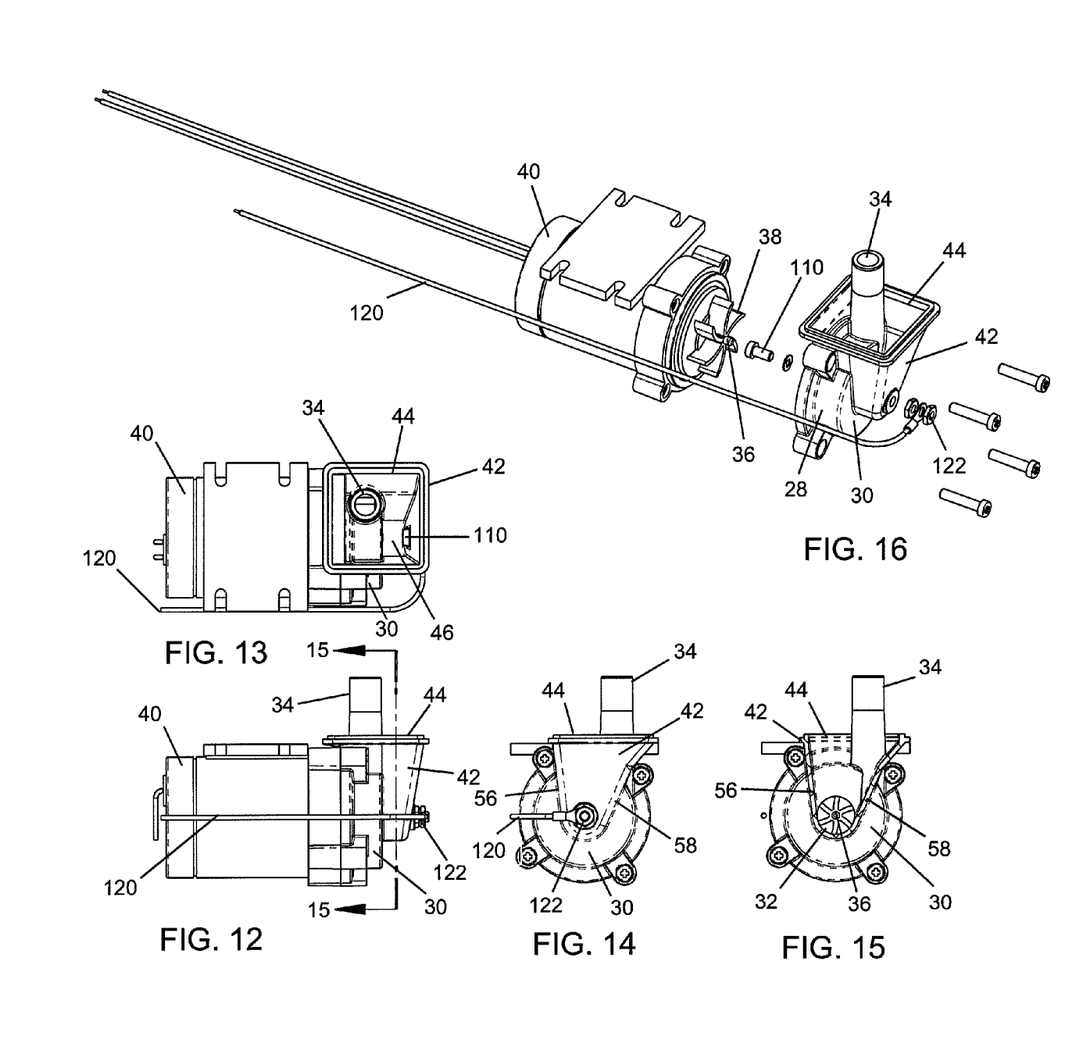
FIG. 12 is a front elevation view of the centrifugal pump with a coaxial inlet and outlet for the condensate pump in accordance with the present invention.
FIG. 13 is a top plan view of the centrifugal pump with a coaxial inlet and outlet for the condensate pump in accordance with the present invention.
FIG. 14 is a right side elevation view of the centrifugal pump with a coaxial inlet and outlet for the condensate pump in accordance with the present invention.
FIG. 15 is a section view of the centrifugal pump with a coaxial inlet and outlet for the condensate pump in accordance with the present invention as seen along line 15-15 of FIG. 12.
FIG. 16 is an exploded perspective view of centrifugal pump with a coaxial inlet and outlet for the condensate pump in accordance with the present invention.

With reference to FIGS. 12-16, the centrifugal pump 28 comprises a volute-shaped impeller housing 30 with a pump inlet 32 (FIG. 15) in the center of the volute-shaped housing 30 and a pump outlet 34 at the periphery of the volute-shaped housing 30. An impeller 36 with impeller blades 38 is mounted for rotation within the volute-shaped impeller housing 30 (FIG. 16). The integrated electric motor 40 drives the impeller 36.

Figure 11:
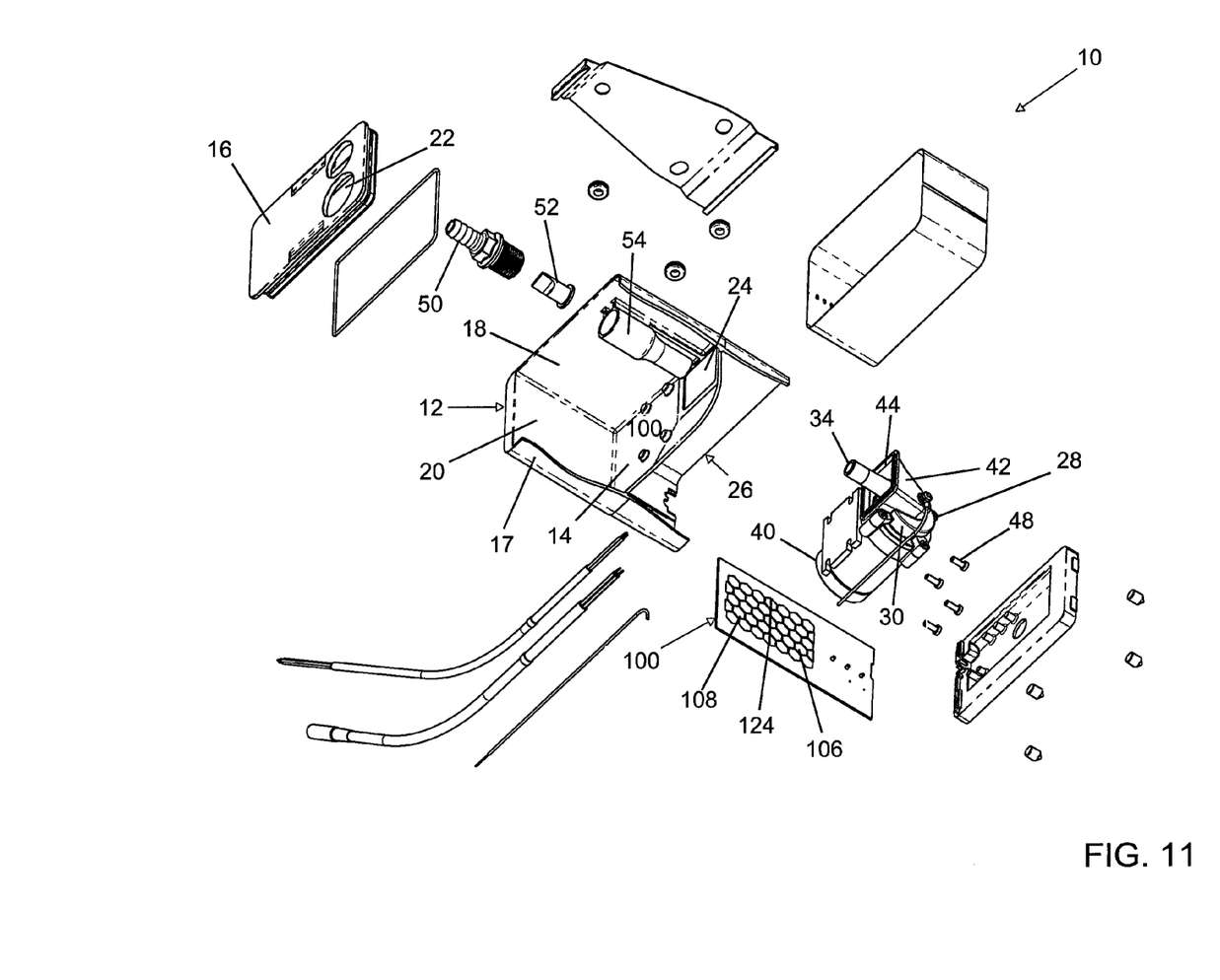
FIG. 11 is an exploded perspective view of the condensate pump having a centrifugal pump with a coaxial inlet and outlet in accordance with the present invention.

The tank outlet 24 (FIG. 11) and the pump inlet 32 are connected together by means of a funnel 42 (FIG. 11). The funnel 42 has a large top opening 44 that is connected to the tank outlet 24 (FIG. 11). The funnel 42 at its opposite end has a small opening 46 that is connected to the pump inlet 32 of the volute-shaped impeller housing 30 (FIGS. 13 and 15). The funnel 42 has a substantially vertical side 56 and a facing angled side 58 (FIGS. 14 and 15). The facing angled side 58 directs the flow of water into the volute-shaped impeller housing in a direction counter to the rotation of the impeller thereby inhibiting gas from being trapped at the pump inlet 32. The volute-shaped impeller housing 30, the pump inlet 32, the pump outlet 34, and the funnel 42 can all be molded as a single piece.

Figures 6, 10:
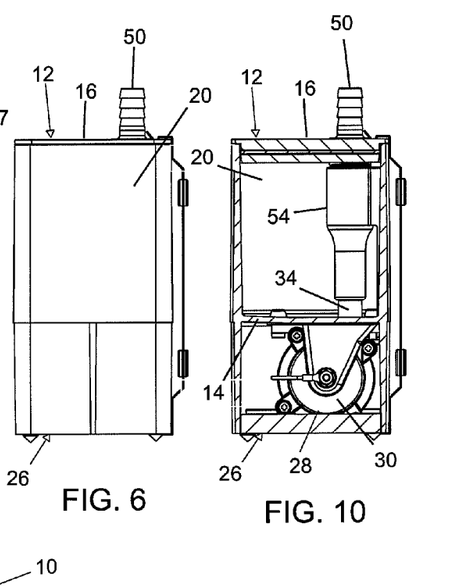
FIG. 6 is a right side elevation view of the condensate pump having a centrifugal pump with a coaxial inlet and outlet in accordance with the present invention.
FIG. 10 is a section view of the condensate pump having a centrifugal pump with a coaxial inlet and outlet in accordance with the present invention as seen along line 10-10 of FIG. 3.

With reference to FIGS. 10-16, the pump outlet 34 from the periphery of the volute-shaped impeller housing 30 is positioned coaxially within the funnel 42 and extends upwardly through the tank outlet 24 into the tank 12 (FIG. 10). The pump outlet 34 is connected to an outlet connector 50 by means of a transition tube 54 and a check valve 52 (FIG. 11). The outlet connector 50 is connected to tubing (not shown) for carrying the condensate water away to a disposal location.

The positioning of the funnel 42 above of the pump inlet 32 in combination with the gravity fed condensate water from the tank 12 reduces the amount of air bubbles that are sucked into the volute-shaped impeller housing 30 through the pump inlet 32. The large opening 44 of the funnel 42 allows air bubbles near the pump inlet 32 to bubble up through the funnel 42 and escape into the condensate water in the tank 12. Consequently, the chances of the centrifugal pump 28 becoming airlock or cavitating are substantially reduced.

In order to control the operation of the electric motor 40 and therefore the centrifugal pump 28, a capacitive liquid level sensor 100 is positioned externally to the tank 12 and a pump sensor terminal 110 (FIG. 13) is positioned adjacent the pump inlet 32. Both the capacitive liquid level sensor 100 and the pump sensor terminal 110 are connected to a control circuit 112 (FIGS. 20A and 20B) for controlling the operation of the motor 40, the operation of water level display LEDs 114 (FIGS. 17, 20A, and 20B), and the operation of an HVAC shutoff relay 128 (FIGS. 20A and 20B).

As shown in FIGS. 8, 11, and 17, 18, 19, 20A, and 20B, the pump sensor terminal 110 (FIG. 13) is positioned adjacent the pump inlet 32 and is connected to the control circuit 112 by means of a collector line 120. The capacitive sensor 100 comprises a circuit board 102 that is positioned externally to one of the tank sides 20 and extends along the majority of the height of the tank 12. A shield foil 104 (FIG. 17) covers the side of the circuit board 102 that faces away from the tank 12. The foil shield 104 may be continuous or patterned in order to adjust the value of the capacitance at sensor foils 106 and 108. The shield foil 104 is connected to the circuit ground to minimize electromagnetic noise and interference from external sources. In order to provide additional shielding against electromagnetic noise interference from external sources, guard ring circuits, such as guard ring circuits 160 and 162 shown in FIGS. 21 and 22, may be employed to lower the impedance of the shield foil 104. The operation of the guard ring circuits 160 and 162 will be described in greater detail below.

Figure 17:
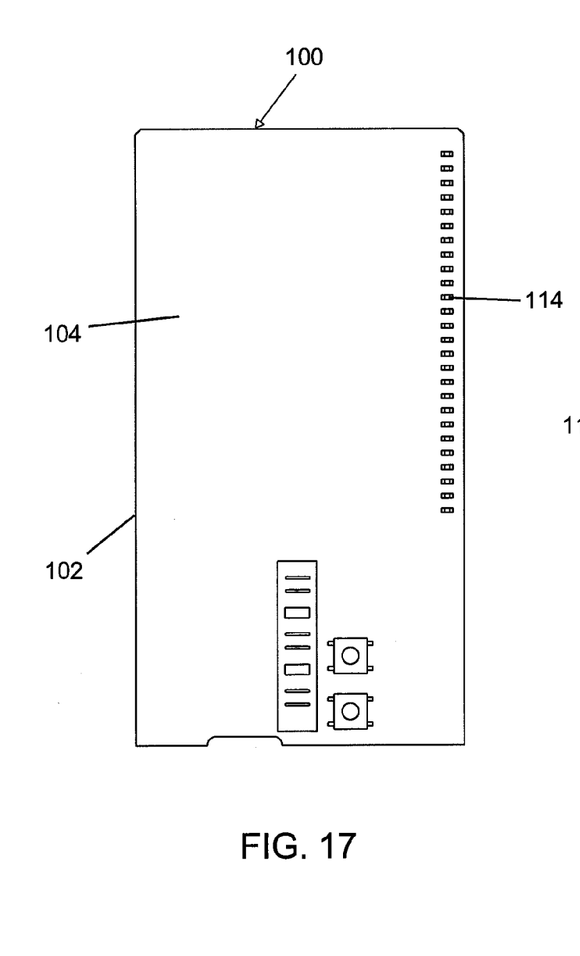
FIG. 17 is a front elevation view of a capacitive sensor for the condensate pump in accordance with the present invention.
Figure 18:
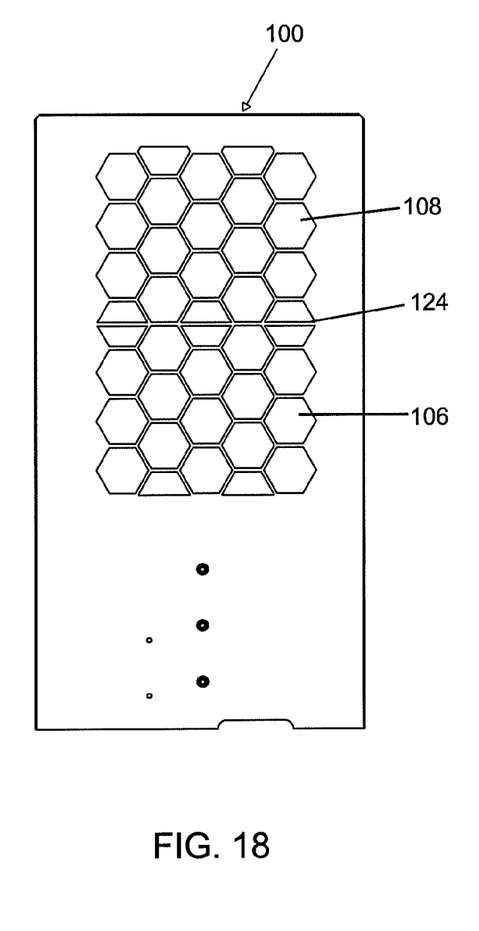
FIG. 18 is a back elevation view of a capacitive sensor for the condensate pump in accordance with the present invention.
Figure 19:
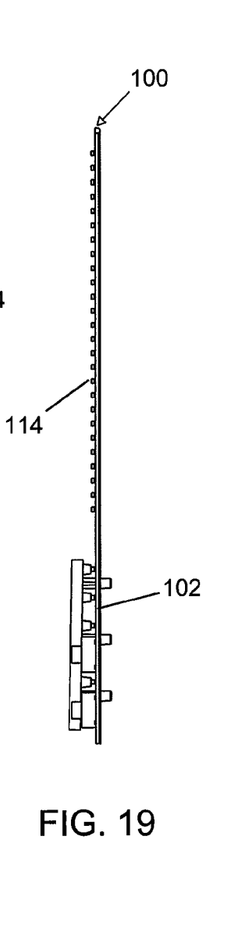
FIG. 19 is a side elevation view of a capacitive sensor for the condensate pump in accordance with the present invention.
Figure 20:
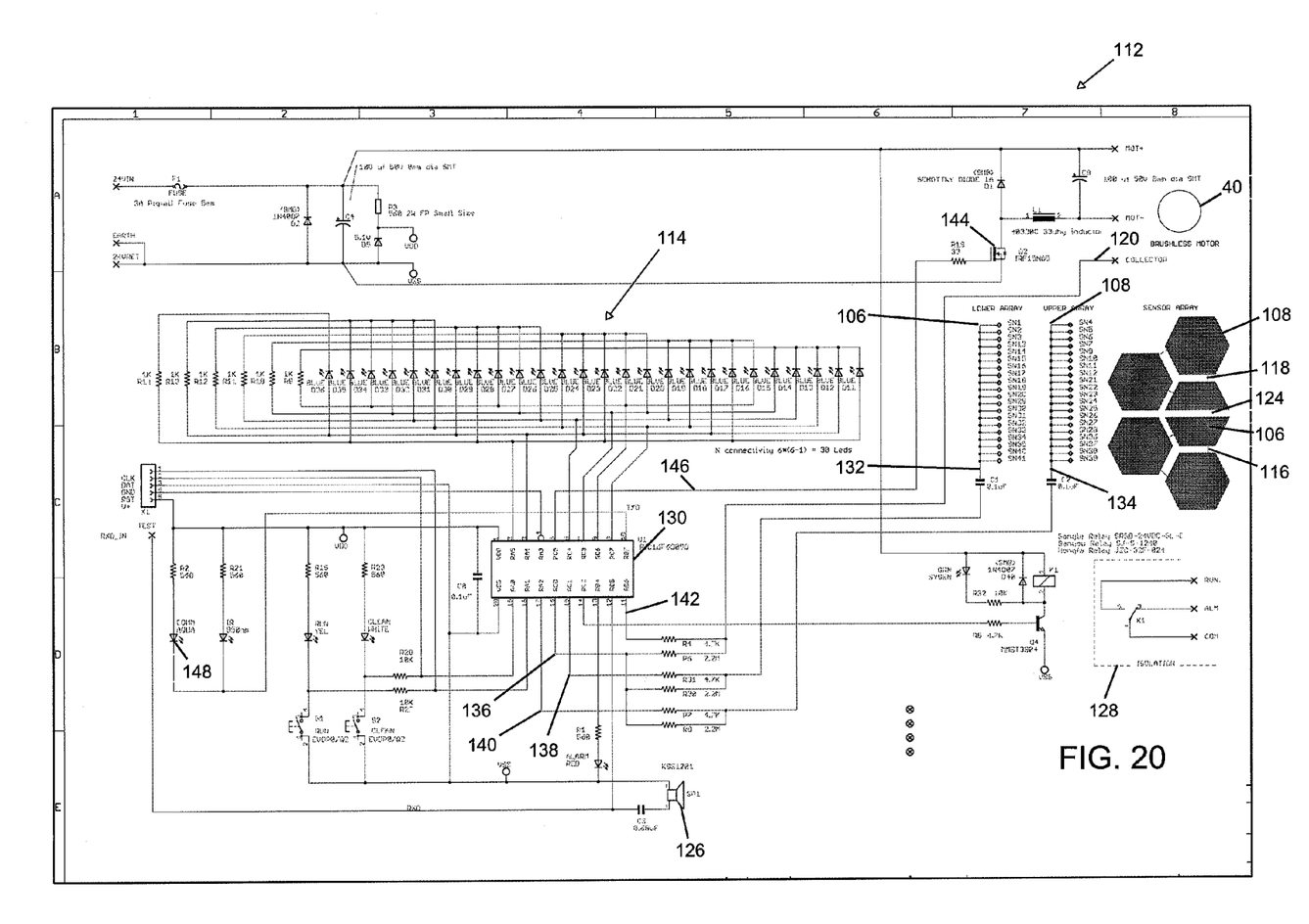
FIGS. 20A and 20B are schematic diagrams of a control circuit for the condensate pump having the capacitive sensor in accordance with the present invention.
Figure 20A:
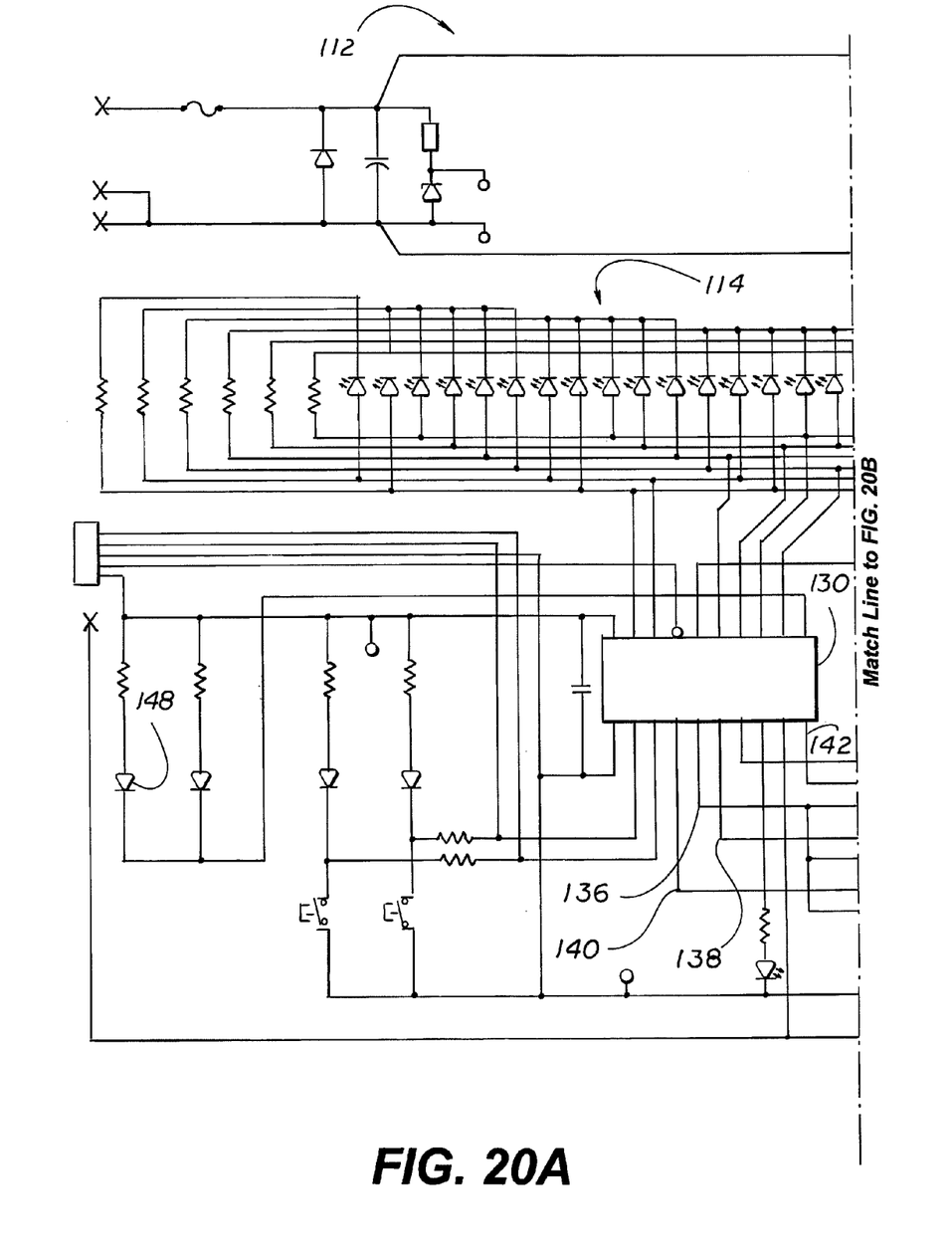
Figure 20B:
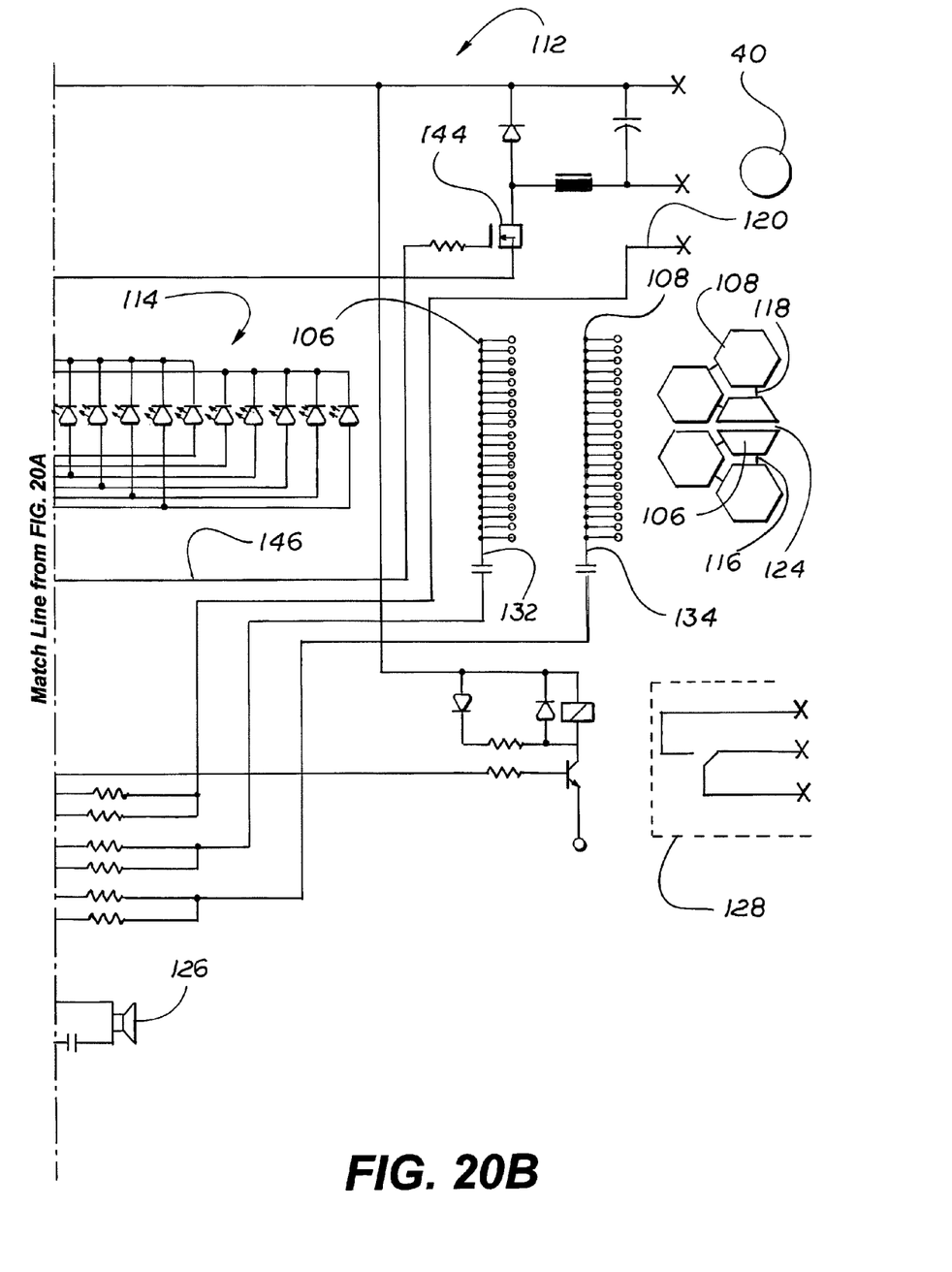

With reference to FIGS. 18, 20A, and 20B, one or more sensor foils, such as first (lower) sensor foil 106 and second (upper) sensor foil 108 cover the other side of the circuit board 102 that faces the tank side 20. The sensor foils 106 and 108 each represent a capacitance plate of a capacitor for which the liquid inside the tank 12 forms part of the capacitor's dielectric. Consequently, as the liquid inside the tank 12 rises and falls, the capacitance value of the sensor foils increases and decreases thereby providing a representation of the level of the liquid inside the tank 12. In the embodiment of the capacitive sensor 100 shown in FIGS. 17, 18, 19, 20A, and 20B, the sensor foils 106 and 108 are configured in a hexagonal pattern with the individual hexagonal foils in the first foil 106 interconnected by foil connector lines 116 and the individual hexagonal foils in the second foil 108 interconnected by foil connector lines 118 (FIGS. 20A and 20B).

Figures 3, 5, 7, 8, 9:
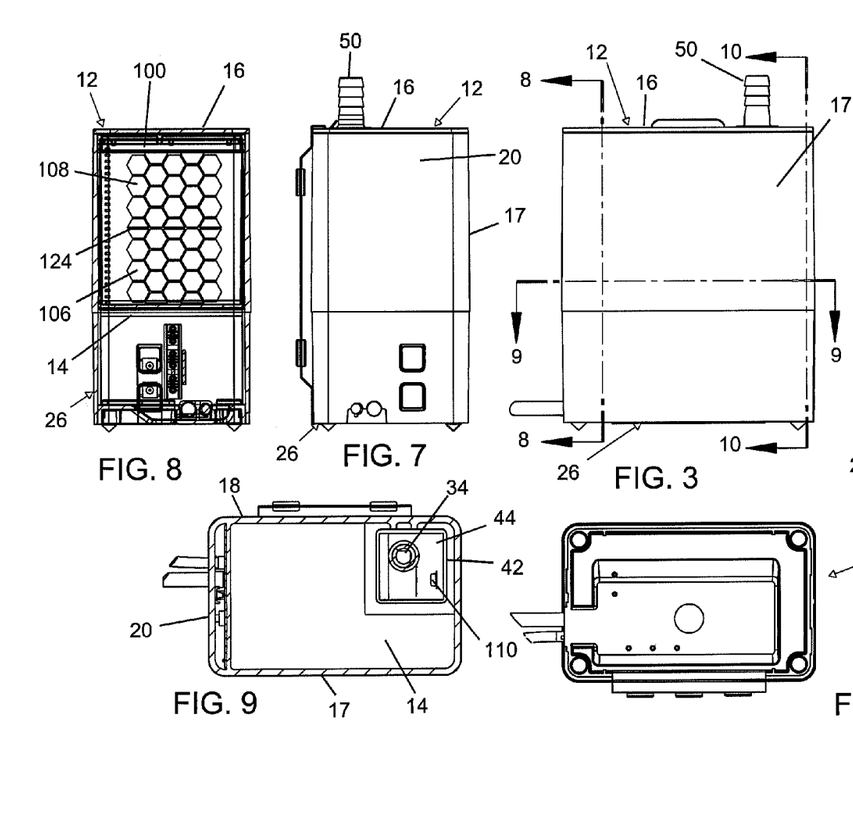
FIG. 3 is a front elevation view of the condensate pump having a centrifugal pump with a coaxial inlet and outlet in accordance with the present invention.
FIG. 5 is a bottom plan view of the condensate pump having a centrifugal pump with a coaxial inlet and outlet in accordance with the present invention.
FIG. 7 is a left side elevation view of the condensate pump having a centrifugal pump with a coaxial inlet and outlet in accordance with the present invention.
FIG. 8 is a section view of the condensate pump having a centrifugal pump with a coaxial inlet and outlet in accordance with the present invention as seen along line 8-8 of FIG. 3.
FIG. 9 is a section view of the condensate pump having a centrifugal pump with a coaxial inlet and outlet in accordance with the present invention as seen along line 9-9 of FIG. 3.
Figure 4:
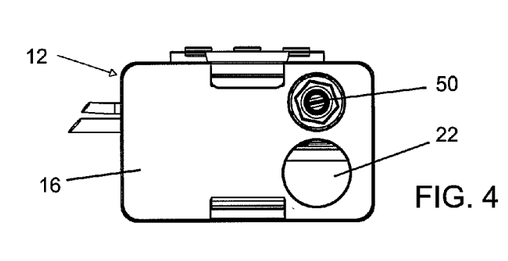
FIG. 4 is a top plan view of the condensate pump having a centrifugal pump with a coaxial inlet and outlet in accordance with the present invention.

As can be seen with reference to FIGS. 8, 17, and 18, the first foil 106 extends from a position near the bottom 14 of the tank 12 to a gap 124 positioned about halfway up the height of the tank 12. After the gap 124, the second foil 108 extends from the gap 124 to near the top 16 of the tank 12. As the liquid in the tank 12 rises above the bottom 14 of the tank 12, the dielectric value for the first sensor foil 106 changes, and as a result, the capacitance value for the first sensor foil 106 changes accordingly (while the capacitance value for the second sensor 108 remains substantially constant). Once the liquid in the tank 12 bridges the gap 124 and then engages the second foil 108, the discontinuity between the first foil 106 and the second foil 108 is recognized by the control circuit 112 so that the halfway reference point of the tank is established and used as a calibration point for the control circuit 112. As the liquid in the tank 12 continues to rise along the height of the second foil 108, the capacitance value for the second foil 108 continues to change accordingly (while the capacitance value for the first sensor 106 remains substantially constant).

In addition to establishing the calibration point by means of the gap 124 between the sensor foils 106 and 108, the calibration point positioned between the top and the bottom of the tank can also be established by mechanical means such as having a tank wall thickness below the calibration point greater than the tank wall thickness above the calibration point or vice versa. Because the wall of the tank represents part of the dielectric that also includes the liquid in the tank, an abrupt change in the tank wall thickness serves to establish an abrupt change in capacitance value, the calibration point, when the water in the tank reaches the transition point between the thick wall of the tank and the thinner wall of the tank.

Turning to FIGS. 20A and 20B, the control circuit 112 controls the operation of the pump motor 40, the liquid level display LEDs 114, an alarm 126, and the HVAC shutoff relay 128. The functions of the control circuit 112 are implemented by a microprocessor 130. The inputs to the control circuit 112 include the first sensor foil line 132, the second sensor foil line 134, and the collector line 120. Each of the lines 132, 134, and 120 connects a capacitance value for the first sensor foil 106, the second sensor foil 108, and the pump sensor terminal 110 to the control circuit 112. In order to determine the capacitance value for the first sensor foil 106, the second sensor foil 108, and the pump sensor terminal 110, the microprocessor 130 has a drive pin 136 that drives a first foil input pin 138 through an RC timing circuit that includes the capacitance value of the first sensor foil 106. The microprocessor drive pin 136 also drives a second foil input pin 140 through an RC timing circuit that includes the capacitance value of the second sensor foil 108. Likewise, the microprocessor drive pin 136 drives a pump sensor input pin 142 through an RC timing circuit that includes the capacitance value of the pump sensor terminal 110.

Particularly, when the microprocessor 130 initiates a sense cycle, the microprocessor 130 starts a counter for each of the input pins 138, 140, and 142, and then the microprocessor 130 begins driving each of the input pins 138, 140, and 142 positively through their respective RC timing circuits. Once each of the input pins 138, 140, and 142 reaches a predetermined threshold value its respective counter is suspended. Once all of the input pins 138, 140, and 142 have reached their respective predetermined threshold values, the microprocessor drive pin 136 reverses polarity and begins discharging the capacitance in the RC timing circuits. At the same time, each of the counters resumes counting. When each of the input pins 138, 140, and 142 reaches a zero value, each of the counters is stopped. The count on each of the counters is thereby proportional to the capacitance value for the first sensor foil 106, the second sensor foil 108, and the pump sensor terminal 110, which is in turn indicative of the level of the liquid in the tank 12. The charge/discharge sequence is employed to minimize any residual dc build up on the capacitance plates or in the circuit components.

While the microprocessor 130 can determine the capacitance value for the first sensor foil 106 (input pin 138), the second sensor foil 108 (input pin 140), and the pump sensor terminal 110 (input pin 142) in parallel fashion as described above, the microprocessor 130 can also determine the capacitance value for the first sensor foil 106 (input pin 138), the second sensor foil 108 (input pin 140), and the pump sensor terminal 110 (input pin 142) in serial fashion. In the serial sensing case, the input pins that are not being sensed are driven to ground and act as an additional shields and ground references for the capacitance plate attached to the input pin that is being sensed. Further, in the serially sensing case, sensing the capacitance values for the first sensor foil 106 (input pin 138), the second sensor foil 108 (input pin 140), and the pump sensor terminal 110 (input pin 142) requires only a single counter implemented by software in microprocessor 130.

Based on the level of the liquid in the tank 12, the microprocessor activates the liquid level display LEDs using a multiplex scheme to give a visual indication of the liquid level in the tank 12. Further, when the liquid in the tank reaches a certain height, the microprocessor 130 starts the motor 40 in order to empty the tank 12. The microprocessor 130 also controls the speed of the motor 40 by varying the pulse width of a speed control signal line 146 to the MOSFET speed control switch 144. Once the level of the liquid in the tank 12 drops below a predetermined level, the microprocessor 130 shuts off the motor 40 until the next pumping cycle is required to empty the tank 12. If the level of liquid in the tank 12 rises above a certain predetermined emergency level, the microprocessor 130 can control the operation of an HVAC shutoff relay 128 to stop the HVAC system and thereby cut off further flow of condensate water into the tank 12. At the same time, the microprocessor 30 can trigger the alarm 126.

In the circumstance where the condensate pump 10 has not received any condensate water for an extended period of time and where all of the condensate water in the tank 12 and in the volute-shaped impeller housing 30 has evaporated, the air within the dried out volute-shaped impeller housing 30 may be trapped by the initial reintroduction of condensate water into the pump inlet 32. The microprocessor 130 determines that the volute impeller housing 30 has dried out by reference to the capacitance value of the pump sensor terminal 110. Once the microprocessor 130 has determined that the volute impeller housing 30 is dry and that air bubbles may be present inside the volute-shaped impeller housing 30, the microprocessor 130 initiates a priming mode startup for the motor 40. In the priming mode, the motor 40 is rapidly turn on and off by the microprocessor 130 in an attempt to dislodge air bubbles that may be attached to the impeller blades 38 of the impeller 36 (FIG. 16).

Figure 21:
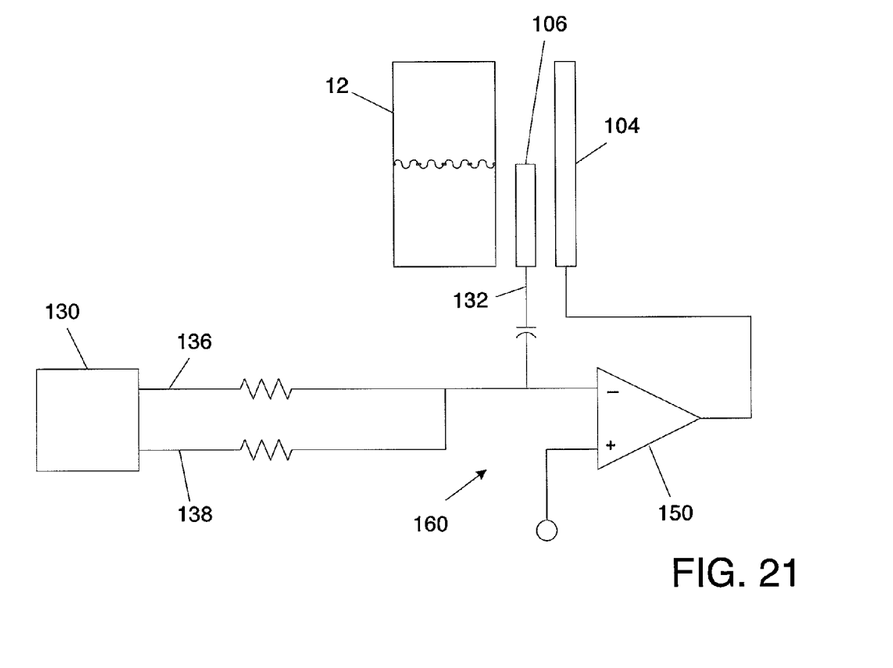
FIG. 21 is a schematic diagram of a negative amplifier (configured as an integrator) for a shielding electrode (guard ring) for the capacitive sensor in accordance with the present invention.
Figure 22:
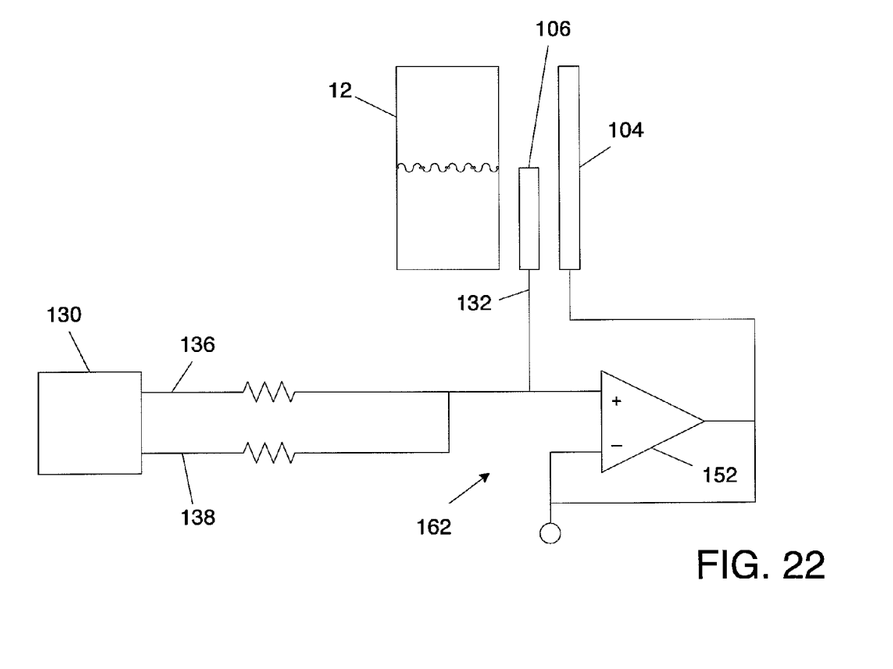
FIG. 22 is a schematic diagram of a positive amplifier (configured as a guard ring) for the capacitance sensor in accordance with the present invention.

Turning to FIGS. 21 and 22, guard ring circuits 160 and 162 serve to shield the sensor foils, such as sensor foil 106, from electromagnetic noise and interference. As previously described, the sensor foils, such as sensor foil 106, are driven positively and negatively by the drive pin 136 of microprocessor 130. With respect to guard ring circuit 160 shown in FIG. 21, an inverting amplifier 150 drives the shield foil 104 with an opposite polarity to that of the charging voltage of drive pin 136. The capacitance between shield foil 104 and sensor foil 106 then becomes the capacitor of an integrator. By adjusting the capacitance between the shield foil 104 and the sensor foil 106, interfering signals superimposed on the sensor foil 106 may be canceled. The guard ring circuit 162 shown in FIG. 22, has an operational amplifier 152 connected as a voltage follower. In this voltage follower configuration, leakage currents that might flow to or from the sensor foil 106 are nullified by the surrounding shield foil 104, which is driven to the same electrical potential as the sensor foil 106.

While this invention has been described with reference to preferred embodiments thereof, it is to be understood that variations and modifications can be affected within the spirit and scope of the invention as described herein and as described in the appended claims.

I claim:

1. A liquid handling system comprising:
   a. a tank for collecting liquid and having a tank inlet for receiving the liquid and a tank outlet;
   b. a pump located outside of the tank for pumping the liquid from the tank to a remote location, the pump comprising:
      i. a volute impeller housing having a pump inlet and a pump outlet;
      ii. an impeller mounted for rotation inside the volute impeller housing;
      iii. a motor for driving the impeller;
   c. a funnel-shaped tube having a large opening connected to the tank outlet and a smaller opening connected to the pump inlet;
   d. a liquid level detector for detecting the level of liquid in the tank and for controlling the operation of the motor; wherein the pump is located below the tank and wherein the pump outlet extends through the funnel-shaped tube and is positioned within the funnel-shaped tube.

2. The liquid handling system of claim 1, further comprising a pump sensor located adjacent the pump inlet for determining the presence of liquid at the pump inlet.

3. The liquid handling system of claim 1, wherein the funnel-shaped tube is configured with an angled face to produce a flow of water into the volute-shaped impeller housing in a direction counter to the rotation of the impeller thereby inhibiting gas from being trapped at the inlet to the volute-shaped impeller housing.

4. The liquid handling system of claim 1, wherein the liquid level detector comprises:
   a. an external tank sensor located external to the tank comprising
   b. a capacitive sensor comprising
      i. a circuit board positioned proximate to a wall of the tank and extending vertically along the wall of the tank;
      ii. a shield foil attached to a first side of the circuit board opposite the wall of the tank; and
      iii. at least one sensor foil attached to a second side of the circuit board between the circuit board and the wall of the tank; and
   c. a control circuit for determining the level of liquid in the tank and for controlling the operation of the motor by determining the capacitance value of the at least one sensor foil.

5. The liquid handling system of claim 4, wherein the control circuit further comprises a drive circuit connected through a resistance to the at least one sensor foil for charging the at least one sensor foil to a first predetermined voltage value, determining the time required to charge the at least one sensor foil to the first predetermined voltage value, correlating the determined time to a capacitance value of the at least one sensor foil of the capacitive sensor, and correlating the capacitance value with a level of liquid in the tank.

6. The liquid handling system of claim 4, wherein the shield foil has a pattern of discontinuities to adjust the capacitance value of the shield foil.

7. The liquid handling system of claim 4, wherein the at least one sensor foil has a pattern of discontinuities to adjust the capacitance value of the at least one sensor foil.

8. The liquid handling system of claim 4, wherein the at least one sensor foil comprises a plurality of sensor foils with one or more gaps between the sensor foils to create a capacitive discontinuity between the sensor foils.

9. The liquid handling system of claim 4, wherein wall of the tank adjacent the at least one sensor foil has a varying thickness to create a capacitive variation, including capacity discontinuities, as result of the varying thickness of the tank wall.

10. The liquid handling system of claim 5, wherein the drive circuit of the control circuit charges the at least one sensor foil to the first predetermined voltage value with a first polarity and then discharges the at least one sensor foil to a second predetermined voltage value with a reversed polarity.

11. The liquid handling system of claim 5, wherein the drive circuit includes a guard ring circuit that charges the shield foil with a polarity that is opposite polarity in which the drive circuit charges the at least one sensor foil.

12. The liquid handling system of claim 5, wherein the drive circuit includes a guard ring circuit comprising a voltage follower configuration, wherein leakage currents flowing from the at least one sensor foil are nullified by the shield foil, which is driven to the same electrical potential as the at least one sensor foil.

* * * * *